United States Patent [19]

Hirschberger

[11] Patent Number: 5,114,333
[45] Date of Patent: May 19, 1992

[54] DIE HEAD FOR PLASTIC WITH BARRIER FORMING MATERIAL

[75] Inventor: Michael Hirschberger, Sylvania, Ohio

[73] Assignee: Hoover Universal, Inc., Plymouth, Mich.

[21] Appl. No.: 626,336

[22] Filed: Dec. 13, 1990

Related U.S. Application Data

[63] Continuation of Ser. No. 418,554, Oct. 10, 1989, abandoned.

[51] Int. Cl.$^5$ .............................................. B29C 47/22
[52] U.S. Cl. ...................................... 425/466; 425/532
[58] Field of Search ................... 425/72.1, 326.1, 466, 425/467, 131.1, 133.1, 380, 381, 382.4, 532

[56] References Cited

U.S. PATENT DOCUMENTS

| | | | |
|---|---|---|---|
| 3,267,194 | 8/1966 | Stenger | 264/328.17 |
| 3,694,123 | 9/1972 | Cook et al. | 425/381 X |
| 4,063,865 | 12/1977 | Becker | 425/380 X |
| 4,201,532 | 5/1980 | Cole | 425/467 X |
| 4,731,216 | 3/1988 | Topolski | 425/381 X |
| 4,859,068 | 8/1989 | Sironi | 425/131.1 X |
| 4,890,994 | 1/1990 | Shapler et al. | 425/467 X |

FOREIGN PATENT DOCUMENTS

| 1479328 | 4/1969 | Fed. Rep. of Germany. |
|---|---|---|
| 2440560 | 3/1975 | Fed. Rep. of Germany. |

*Primary Examiner*—Richard L. Chiesa
*Attorney, Agent, or Firm*—Harness, Dickey & Pierce

[57] ABSTRACT

A sidefed die head for forming multiple tubular plastic parisons having a plurality of barrier walls contained in a matrix resin so as to form a plurality of discontinuous, substantially two dimensional barrier walls within the matrix resin which overlap one another so as to form a barrier to permeability. The die head includes a diverter sleeve for each parison to create two counter-rotating circumferential spiral flow channels of resin to form each parison wherein the barrier resin within the matrix resin is stretched to form streaks which are then elongated to form platelets within the matrix resin. The two spiral flow channels form parisons having two concentric layers, each layer having a radial weld line. By positioning the weld lines in each layer circumferentially offset from each other, a single radial weld line through the parison is prevented. The spiral flow channel also increase the impact strength of the container and improves the uniformity in the parison wall thickness.

3 Claims, 2 Drawing Sheets

DIE HEAD FOR PLASTIC WITH BARRIER FORMING MATERIAL

This is a continuation of U.S. Pat. application Ser. No. 418,554, filed Oct. 10, 1989, now abandoned.

BACKGROUND AND SUMMARY OF THE INVENTION

This invention relates to an extrusion die head for making a plastic parison and in particular to a die head for making multiple parisons for producing containers having a matrix resin with a barrier forming second resin therein which is discontinuous and distributed within the matrix resin.

Certain organic solvents must be packaged and stored in containers that provide a permeability barrier which is substantially greater than is provided by conventional high density polyethylene (HDPE) containers. One way to improve the barrier is by a co-extrusion process which forms a multi-layer parison having, for example, inner and outer surface layers of HDPE and a middle barrier layer sandwiched between adhesive layers. A disadvantage with co-extrustion is the need for a separate extrusion screw for each plastic resin. Furthermore, it is extremely difficult to feed several resins to a multiple parison die head. Another way to provide a barrier container is by controlled mixing of a barrier resin, such as DuPont's SELAR RB, with a matrix resin such as HDPE. SELAR RB barrier resin is a modified nylon and an adhesive which can be dry-blended with a matrix resin, and then extrusion blow molded using a single extrusion screw. Pellets of the barrier resin are partially mixed with the matrix resin under controlled extrusion conditions to flatten and elongate to form a plurality of discontinuous, thin layer barrier walls within the matrix resin. These barrier walls overlap one another to provide permeability resistance in the wall of the finished container.

In the DuPont SELAR process the matrix resin and the barrier resin are dry mixed prior to being fed into the extrusion screw. As the pellets of the barrier resin reach their melting temperature, streaks of the barrier resin will be formed. These streaks are formed by shear forces in the resin caused by the rotating screw and are substantially circumferential. As the resin flows from the extrusion screw and through the die head to form a tubular parison, the selar streaks form barrier walls in the matrix resin which, in the finished container, overlap one another to provide permeability resistance in the container wall. A prerequisite to providing the desired permeability barrier is in controlled mixing of the barrier resin with the matrix resin. Proper mixing will produce many large, essentially two dimensional, barrier walls within the matrix resin. If the mixing is inadequate, the pellets of the barrier resin will not stretch and elongate to form the barier walls, thus resulting in little improvement in the permeability resistance of the finished article over that provided by the matrix resin itself. If the barrier resin is over mixed, the barrier walls will break apart into small particles with little improvement in permeability resistance resulting.

The proper mixing of the barrier resin with the matrix resin has been successfully accomplished with single parison die heads. However, attempts to produce barrier containers with multiple parison die heads, particularly three or more parison die heads, have had little success. In many cases, the resulting containers have no, or only little, improvement in permeability resistance. Research has indicated that one possible explanation for the difference in barrier performance of containers from single parison die heads compared to multiple parison die heads is as follows.

At the end of the screw, the flow of resin changes from primarily a circumferential flow direction to an axial flow direction as the resin flows into an adapter between the extrusion screw and the die head. During the axial flow, shear forces in the resin stream cause the generally circumferential barrier resin streaks to elongate axially, forming two-dimensional platelets in the matrix resin. In the case of a single parison center-fed die head, these platelets remain relatively undisturbed as the resin flows into the die head around the core to form a tubular parison. When the parison is blow molded, the platelets form a plurality of discontinuous, substantially two-dimensional thin layer barrier walls within the matrix resin. These barrier walls overlap one another to provide permeability resistance in the container wall.

When the resin is fed from the extrusion screw to a multiple parison die head such as a triple parison die head, the division of the resin melt into three separate conduits at the end of transfer pipe or tube disrupts the desireable structure of the barrier resin platelets. When the resin is divided, many of the platelets are broken apart such that in the finished container, there are gaps or windows in the container wall having few or no barrier walls. These containers have no or only little barrier improvement over that provided by the matrix resin individually.

It is an object of the present invention, therefore, to provide a multiple parison die head for producing containers with a barrier resin within a matrix resin in which the barrier performance in the containers is equal to or better than the barrier performance of containers produced with a single parison die head.

It is another objective of the invention that each parison from the multiple parison die head produce containers having relatively uniform barrier performance compared to one another.

It is yet another objective to achieve the above objectives in a side fed die head which offers cost advantages over a center fed die head.

The die head of the present invention meets the above objectives by producing a resin flow path which has several features similar to the resin flow path in the extrusion screw that forms the barrier resin platelets initially. This is accomplished by a downwardly spiral flow channel through which the resin melt follows a primarily circumferential path to rearrange the barrier resin platelets. During this circumferential flow, molten particles of the barrier resin will stretch, forming substantially circumferential streaks. After a predetermined length of travel in the spiral flow channel, a clearance in the die head enables a portion of the resin to flow axially downward. During the downward flow the circumferential streaks elongate to form the platelets.

The die head of the present invention includes a diverter sleeve which forms two resin flow channels in the die head that form downwardly spiral paths rotating circumferentially in opposite directions from one another. The two flow channels converge at the lower end of the diverter sleeve to form a tubular resin body within the die head that is extruded from the die head to form a tubular parison. The two spiral flow channels are concentric about a common axis with one channel radially inward of the other. As a result of the two concentric flow channels, the parsion is formed of two concentric resin layers, each having a radially extending weld line. The flow channels are configured such that the two weld lines are circumferentially displaced from one another.

By providing two concentric layers in the parison, any gaps in the overlapping barrier walls formed in one layer will likely be covered by barrier walls formed in the other channel. Furthermore, the formation of a weld line in the tubular parison that extends radially completely through the container wall can be prevented. Because no platelets are formed that extend circumferentially across the weld line, steps must be taken to prevent the formation of a radial weld line extending completely through the parison. By forming the parison with two concentric layers with the weld line of one layer displaced from the weld line of the other layer, the weld line formed in one layer will be covered by barrier walls in the other layer such that no region is created in the container wall without barrier walls. It is an advantage of this invention therefore, that no weld line is formed extending radially completely through the parison wall.

It is another advantage of the invention that with two partial weld lines rather than a single weld line, the strength of the resulting container will be increased. This strengthening effect is more pronounced with SELAR RB resin than with a homogeneous resin.

It is still another advantage of the invention that the die head has no or few resin stagnation points in the flow channels. This enables faster resin color changes to be made in comparison to standard side fed die heads.

It is still another advantage of the invention that greater uniformity in the distribution of the barrier resin is achieved. Uniform distribution of the barrier resin results in uniformity in resin stretching during blow molding and more even wall thickness distribution in the finished container.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
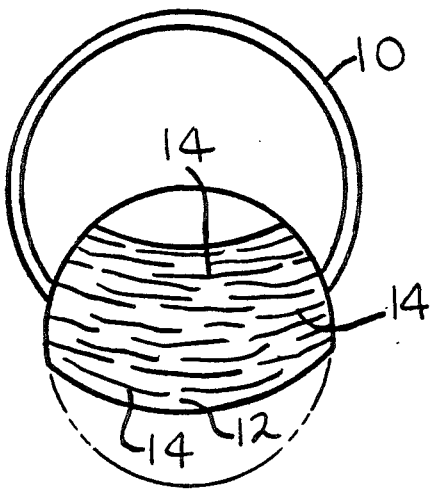
FIG. 1 is an end view of a container wall manufactured according to this invention with a portion broken away and enlarged to show the barrier walls within the matrix resin.
Figures 3, 4:
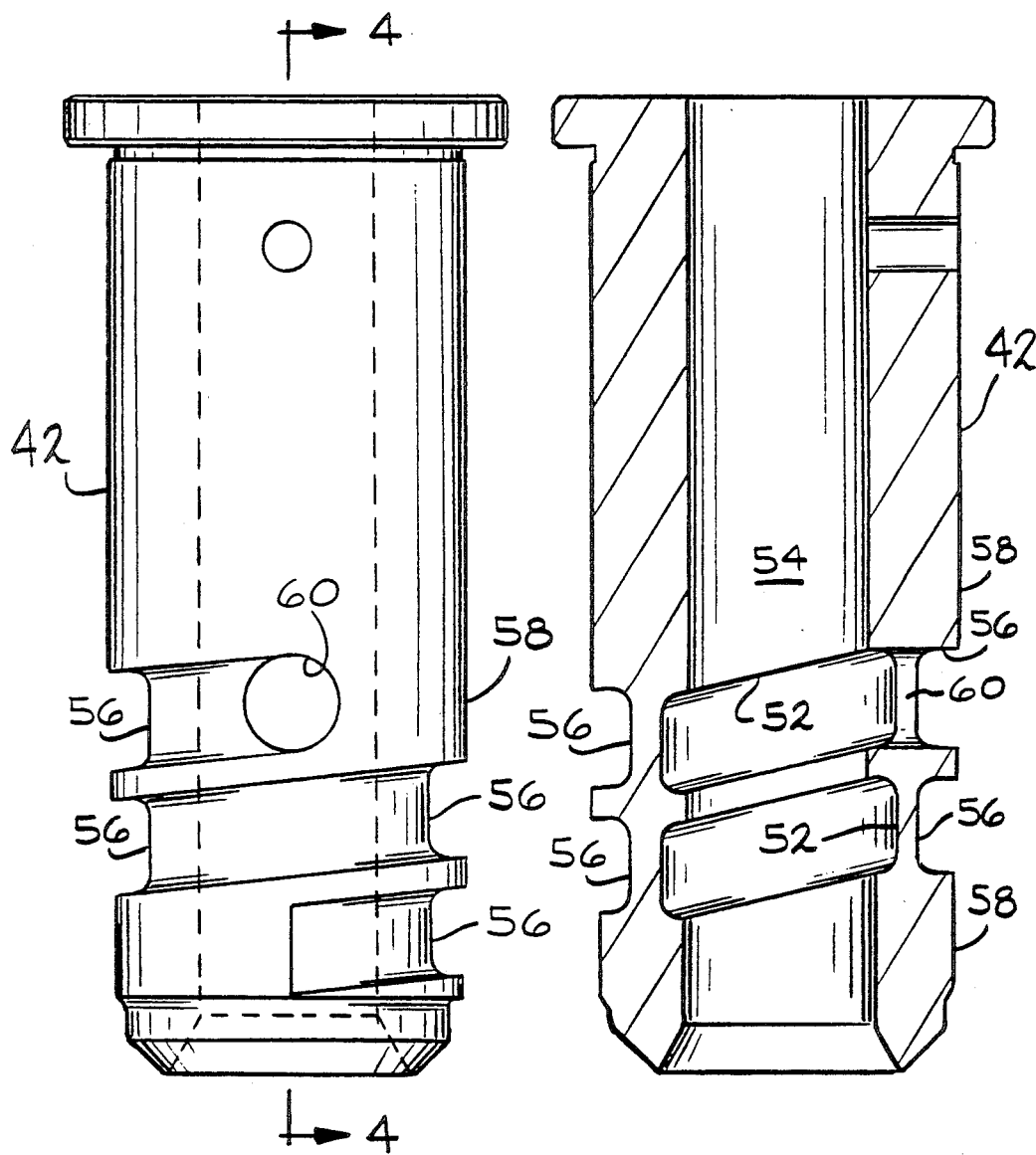
FIG. 3 is an enlarged elevational view of the diverter sleeve shown in FIG. 2.
FIG. 4 is a sectional view of the diverter sleeve as seen from substantially the line 4—4 in FIG. 3.

An end view of a plastic container 10 made from the die head of the present invention is shown in FIG. 1. The plastic article 10 is blow molded from a plastic parison containing a matrix resin 12 such as high density polyethylene and a barrier resin such as SELAR RB which forms a plurality of discontinuous, thin layer barrier walls 14 in the matrix 12. The barrier walls 14 overlap one another in the wall of article 10 to provide a permeability barrier.

Figure 2:
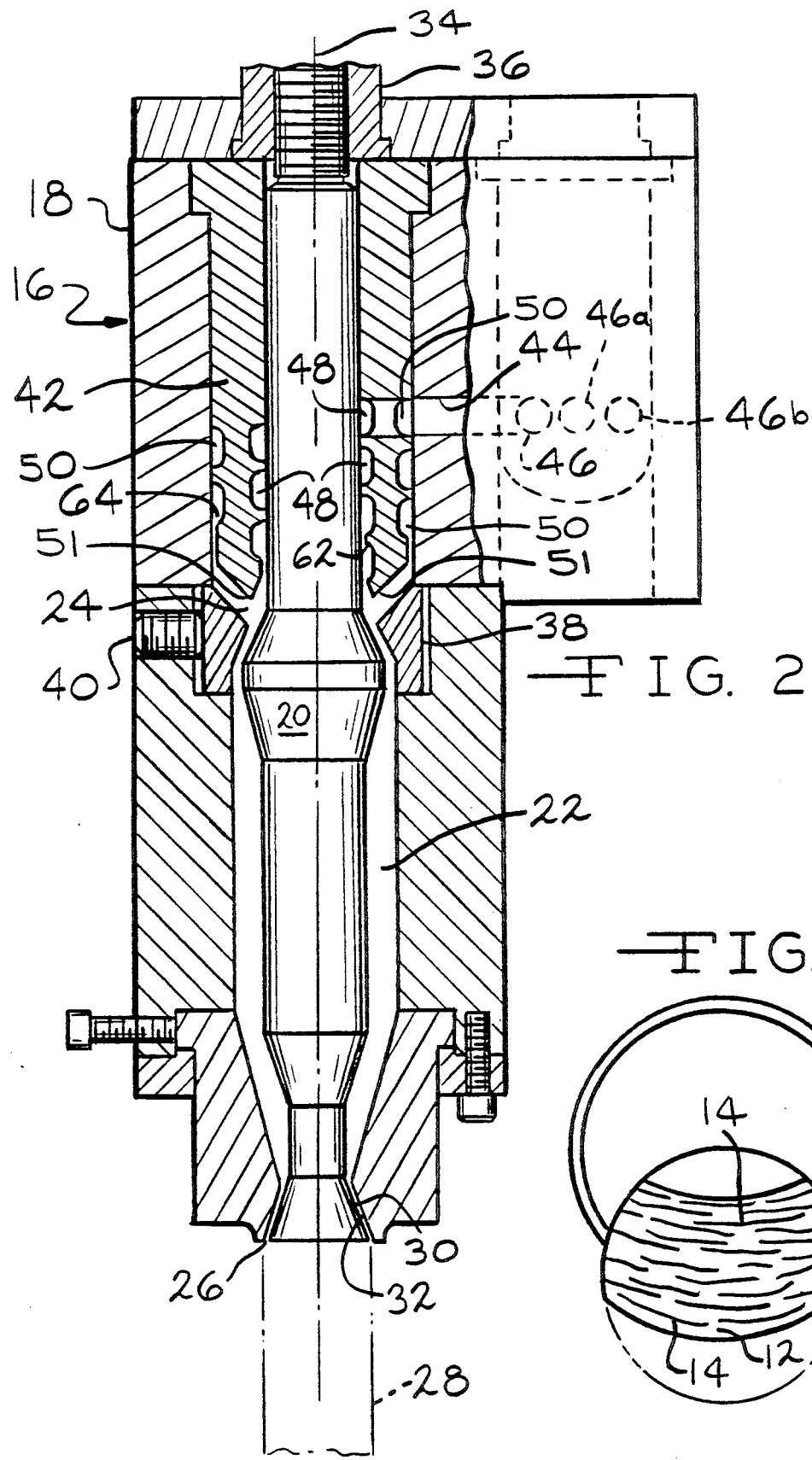
FIG. 2 is an elevational view of the die head in section illustrating the diverter sleeve used to form the two counter-rotating resin flow channels.

The die head of the present invention is shown in cross-section in FIG. 2 and designated generally at 16. The die head 16 is useful for the production of multiple parisons, in this case three parisons, of a matrix resin having a barrier resin forming barrier walls therein. The die head 16 is constructed of a die body 18 surrounding a generally cylindrically shaped mandrel 20 in a spaced relation thereto to form a tubular chamber 22. The chamber 22 includes an open upper end 24 and an annular outlet orifice 26 at its lower end.

A tubular resin body is formed in the chamber 22 and extruded through the annular outlet orifice 26 to form a tubular parison, such as parison 28 shown below the outlet 26. The mandrel and the die body, adjacent their lower ends, have radially inclined surfaces 30 and 32 respectively which are generally parallel to each other. Axial movement of the mandrel 20 in a direction parallel to the upright mandrel axis 34 will vary the spacing between the inclined surfaces 30 and 32 so as to regulate the resin flow rate through the outlet orifice 26 forming the parison 28. The mandrel is supported in the die body by a threaded collar 36 at the upper end of the die body which can be rotated to provide axial movement of the mandrel to adjust the resin flow rate. A flow adjusting ring 38 is included in the die body which is adjustable by a plurality of radial screws 40 to adjust the resin flow in the tubular chamber in order to balance the resin circumferentially in the annular chamber.

A diverter sleeve 42 surrounds the mandrel and is positioned immediately above the chamber upper end 24. Sleeve 42 is used to form barrier walls from the barrier resin in the matrix resin. Sleeve 42 is in communication with an inlet passage 44 in the die body which is in turn in communication with an extrusion screw to receive molten resin from conduit 46. Conduits 46a and 46b feed resin to two other tubular chambers in the die head for producing multiple parisons. The inner surface 54 of the sleeve 42 is adjacent the mandrel with a portion of the sleeve inner surface 54 engaging the mandrel and a portion of the sleeve spaced from the mandrel as will be described below. Likewise, the outer surface 58 of the sleeve is adjacent the die body with a portion of the sleeve outer surface 58 engaging the die body and a portion of the sleeve spaced from the die body.

The sleeve 42, in cooperation with the mandrel and die body, forms two separated, counter-rotating spiral flow channels 48 and 50. The radially inner spiral flow channel 48 is formed by a spiral groove 52 machined in the inner surface 54 of the sleeve 42. Channel 48 directs the resin in a circumferential direction counterclockwise when viewed axially from the top of the die head 16. Outer channel 50 is formed by a spiral groove 56 machined into the outer surface 58 of the sleeve 42. The flow channel 50 directs the resin in a circumferentially clockwise direction when viewed axially from above the die head 16.

The upper end of the two resin flow channels are in communication with one another through a connecting port 60 in the diverter sleeve 42. The connecting port 60 is disposed in alignment with the inlet passage 44 such that resin flow from the extrusion screw is divided in two, with a portion of the resin flowing through the inner spiral flow channel 48 and the remainder flowing through the outer spiral flow channel 50.

The inner surface 54 of the diverter sleeve engages the mandrel during approximately one revolution of the spiral flow channel 48. In this portion of the flow channel, the flow of resin is restricted to a circumferentially spiral flow intended to duplicate the circumferential resin flow in the extrusion screw. After one revolution, the sleeve inner wall 54 is spaced from the mandrel as shown at 62. This clearance between the mandrel and the sleeve allows a portion of the resin to flow vertically downward between the sleeve and the mandrel while the remaining portion of the resin in the inner flow channel continues to flow circumferentially.

The clearance enables a gradual runoff of the resin from the spiral flow to a vertical flow to form the tubular parison. It is necessary to provide for a gradual runoff of the resin rather than releasing the resin from the spiral channel at a single point. The gradual runoff prevents an uncontrolled spread of the resin around the mandrel in a manner which could destroy the platelet structure and also prevents the formation of a localized thickening of the parison wall. The clearance between the mandrel and the sleeve provides a gradual runoff of resin as it continues to flow circumferentially, thus controlling the resin flow and providing a uniform wall thickness in the tubular parison.

Likewise, with respect to the outer flow channel 50, the outer surface 58 of the diverter sleeve engages the die body so that the resin flow in the outer spiral channel 50 is in a circumferential spiral direction. Again, after approximately one revolution, the outer surface of the sleeve is spaced from the die body as shown by the clearance 64 so that a portion of the resin will flow vertically downward between the sleeve and the die body while the remaining resin continues to flow circumferentially.

During the circumferential spiral flow in the channels 48 and 50, particles of molten barrier resin elongate to form streaks within the spiral matrix resin. These streaks are formed by shear forces within the spiral resin flow stream. When the resin flows vertically downward, the streaks in the resin are elongated to form substantially two dimensional platelets within the matrix resin. These platelets are also formed by shear forces in the downwardly flowing resin. The platelets remain in the resin as it flows through the chamber 22 and outlet orifice 26 forming the parison 28 and form the barrier walls in the finished container.

When the resin flowing in the two channels 48 and 50 reaches the lower end 51 of the sleeve 42, the two resin streams merge together and flow through the open upper end 24 of the tubular chamber 22. In the chamber 22, the resin forms a tubular body which is extruded through the annular outlet 26 to form the tubular parison 28. The resin from the outer channel flows radially around the resin from the inner channel as the resin flows into the tubular chamber 22. As a result, the tubular resin body in chamber 22 is formed of two concentric layers.

It is desirable that both the inner and outer layers have approximately equal amounts of resin. To provide an equal division of resin into the two spiral flow channels, the developed length of each spiral channel is the same so that the resistance to flow through the channels will be substantially the same to produce equal resin flow rates through the two channels. Because the inner spiral flow channel is wrapped around a smaller diameter, it will have a greater number of revolutions around mandrel. The outer channel completes one revolution in the spiral channel before the clearance allows downward resin flow. To provide the same length of spiral flow in the inner channel before the clearance, the inner channel must complete more than one revolution.

As a result of the two resin layers in the tubular parison, any gaps or windows in the overlapping barrier walls within one layer will likely be covered by barrier walls in the other layer. The two layers in the parison also prevent the formation of a weld line in the tubular parison that extends radially completely through the container wall. Each layer will have a weld line that extends radially through only that layer. By constructing the spiral flow channels so that the weld lines of two layers are circumferentially offset from each other, there will be no weld line radially through the container wall. It is necessary to prevent the formation of a radial weld line because no barrier walls will extend circumferentially across a weld line. If a radial weld line is formed through the parison wall, there will be a gap in the barrier walls at the weld line, thus increasing the permeability of the container. With the die head of this invention, the weld line formed in one layer of the parison will likely be covered by barrier walls in the other layer to reduce the container permeability.

The die head of the present invention provides a controlled structure of a barrier resin within a matrix resin, such as high density polyethylene, to form a tubular parison that includes a plurality of relatively thin, substantially two dimensional overlapping barrier walls in the matrix resin even though the structure of the barrier walls was destroyed by splitting the melt flow from one transfer tube into three conduits. When the parison is blow molded to form a finished plastic article, the overlapping barrier walls serve to reduce or prevent permeability through the container walls.

The diverter sleeve 42, while shown in a triple parison die head, can be used in die heads for producing other numbers of parisons. In addition, the diverter sleeve can also be used to form a parison of a single resin where the advantages previously discussed are desired such as faster color changes and the prevention of a single weld line through the parison.

The die head of this invention achieves the objective of producing containers having a barrier performance equal to or greater than the barrier of containers produced with a single parison die head. This is accomplished by forming the barrier platelets in the die head immediately prior to the resin being extruded from the die head. By forming the platelet in the die head, there are no disruptions in the resin flow path which destroy the barrier structure after formation.

By forming the barrier structure for each parison in the multiple parison die head under the same conditions, the objective of uniform barrier performance in containers from each parison is achieved. Both of these objectives have been met with a side fed die head.

It is to be understood that the invention is not limited to the exact construction illustrated and described above, but that various changes and modifications may be made without departing from the spirit and scope of the invention as defined in the following claims.

What is claimed is:

1. A die head for forming a hollow tubular parison of plastic material comprising:
   a mandrel having an upright longitudinal axis;
   a die body enclosing said mandrel in a spaced relation thereto forming a tubular chamber having an open upper end and an annular outlet orifice spaced axially below said open upper end, said die body forming an inlet flow passage axially above said chamber open upper end for receiving a solid stream of molten plastic resin; and a diverter sleeve within said die head between said mandrel and said die body and above said tubular chamber open upper end, said sleeve having a radially extending connecting port therethrough aligned with said resin inlet flow passage, said sleeve having an outer surface with a spiral groove therein extending from said connecting port toward said tubular chamber upper end forming an outer spiral flow channel in cooperation with said die body, said outer surface engaging said die body to confine resin within said outer spiral flow channel for at least approximately one revolution around said sleeve afterwhich said outer surface is spaced from said die body to permit a portion of the resin in said groove to flow axially between said sleeve and said die body forming an outer resin body flowing toward said tubular chamber open upper end;

said sleeve having an inner surface with a spiral groove therein extending from said connecting port toward said tubular chamber open upper end forming an inner spiral flow channel in cooperation with said mandrel, said inner surface engaging said mandrel to confine resin within said inner flow channel for at least approximately one revolution around said mandrel afterwhich said inner surface is spaced from said mandrel to permit a portion of the resin in said inner groove to flow axially between said mandrel and said sleeve forming an inner resin body flowing toward said tubular chamber open upper end where said inner and outer resin bodies merge together forming a single hollow tubular resin body in said chamber, said single hollow tubular resin body flowing axially downwardly through said outlet orifice to form said hollow tubular parison.

2. The die head of claim 1 wherein said inner and outer spiral grooves are counter rotating relative to one another.

3. The die head of claim 1 further including means for producing approximately equal resistance to resin flow through said spiral grooves whereby resin is divided substantially equally to flow through said grooves.

* * * * *